United States Patent [19]

Boucaud

[11] Patent Number: 5,071,889

[45] Date of Patent: Dec. 10, 1991

[54] FLAVORED SYNTHETIC MONOFILAMENT BASED ON HOMOPOLYAMIDE OR COPOLYAMIDE

[75] Inventor: Jean Boucaud, Albi, France

[73] Assignee: Rhone Poulenc Fibres, Lyons, France

[21] Appl. No.: 451,189

[22] Filed: Dec. 15, 1989

[30] Foreign Application Priority Data

Dec. 27, 1988 [FR] France .................................. 88 17552

[51] Int. Cl.$^5$ .............................................. C08L 77/00
[52] U.S. Cl. ...................................... 523/1; 43/44.98; 521/184; 523/102; 524/602; 528/335
[58] Field of Search .................... 523/1, 102; 524/602; 43/44.98; 521/184

[56] References Cited

FOREIGN PATENT DOCUMENTS 0034412 3/1979 Japan .................................... 523/102

Primary Examiner—Harold D. Anderson
Attorney, Agent, or Firm—Sherman & Shalloway

[57] ABSTRACT

A flavored synthetic monofilament useful for fishing is prepared by incorporating a flavoring agent throughout the mass of the monofilament. The monofilament can be either a homopolyamide or copolyamide having a breaking strength of at least 50 kg/mm$^2$ for diameters less than or equal to 70/100 mm, of at least 30 kg/mm$^2$ for diameters greater than 70/100 mm and less than or equal to 200/100 mm, and of at least 20 kg/mm$^2$ for diameters greater than 200/100 mm and less than or equal to 300/100 mm and having a capacity to shrink in boiling water of greater than 1%.

5 Claims, 1 Drawing Sheet

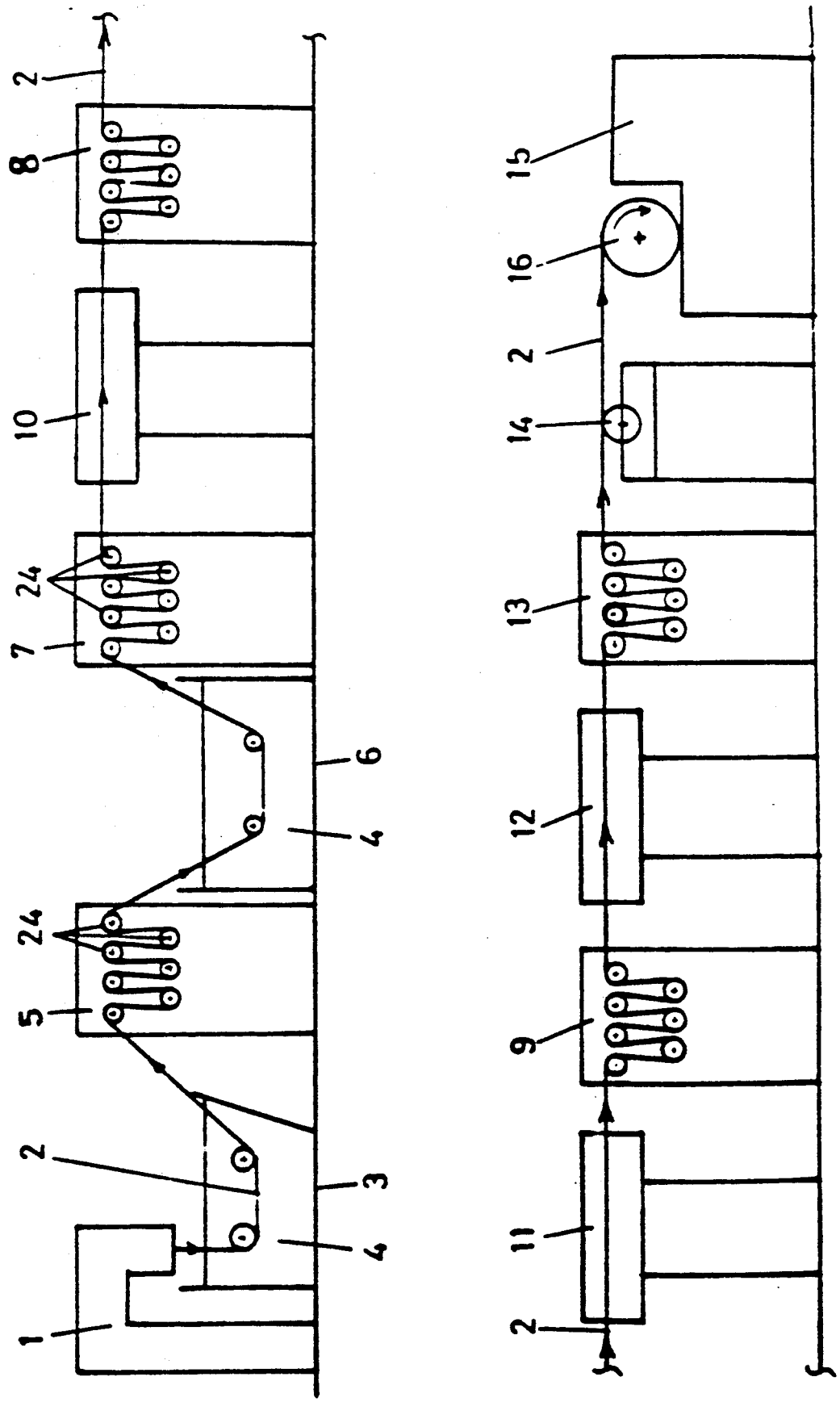

FLAVORED SYNTHETIC MONOFILAMENT BASED ON HOMOPOLYAMIDE OR COPOLYAMIDE

The present application relates to a flavoured synthetic monofilament, its production process and its applications.

A current use of monofilaments is in the fishing industry. It is known that fish are very susceptible to flavours. Thus, it is known that fishermen throw bait consisting of very varied products, which may contain aromas and flavourings, into the water at the fishing location with a view to attracting the fish. It is also known that fishermen may flavour their lures and bait according to the present application, a flavouring is introduced into monofilaments which can be used for fishing or other applications.

The present application relates to a synthetic monofilament based on homopolyamide or copolyamide, characterized by the fact that it is flavoured with at least one flavouring introduced into the mass during its production and that it has a linear breaking strength of at least 50 kg/mm$^2$ for diameters less than or equal to 70/100 mm, of at least 30 kg/mm$^2$ for diameters greater than 70/100 mm and less than or equal to 200/100 mm and of at least 20 kg/mm$^2$ for diameters greater than 200/100 mm and less than or equal to 300/100 mm and a shrinkage in boiling water of at least 1%.

For monofilaments intended for use as fishing lines, the shrinkage in boiling water is at least 8%.

The polyamide used is the polymer of $\epsilon$-caprolactam (polyamide 6) or the polymer of hexamethylenediamine and adipic acid (polyamide 66). It is also possible to use copolymers such as the copolymer of hexamethylenediamine, adipic acid and $\epsilon$-caprolactam (copolyamide 66/6 or 6/66), the copolymer of hexamethylenediamine, adipic acid and 11-aminoundecanoic acid (copolyamide 66/11), the copolymer of $\epsilon$-caprolactam and 11-aminoundecanoic acid (copolyamide 6/11), the copolymer of $\epsilon$-caprolactam and 9-aminononanoic acid (copolymer 6/9), and the copolymer of $\epsilon$-caprolactam and 1,12-dodecanolactam (copolyamide 6/12). Preferably, 66/6 copolymers are used which enable filaments to be obtained which are very supple, highly resistant and relatively very porous and which have the characteristic of very rapidly becoming pliable in water, this feature of becoming pliable being linked to a very rapid penetration of water into the interior of the porous filament. This porous filament is of interest because it dries very rapidly once it has been removed from water.

Advantageously, a copolyamide 66/6 having the following proportions by weight is used: polyamide 66: 75 to 90% / polyamide 6: 25 to 10%. Preferably, a copolyamide 66/6 in the proportions 75/25 is used.

All flavourings resistant to the temperatures to which the polymer is subjected during the process for the production of the monofilament can be used. A certain number of flavourings are used in the examples, the list of these flavourings obviously not being limiting. Flavourings is used to denote either flavourings in the proper sense of the term or adjuvants such as aromas generally releasing flavours suitable for attracting the sense of taste of fish, such as those cited in a non-limiting manner in the examples.

The monofilament may be coloured or colourless.

The present invention also relates to a process for the production of the flavoured synthetic monofilaments according to the above definition. This process for the production of flavoured synthetic monofilaments, by extrusion of a molten mass of polymer based on homopolyamide or copolyamide through a die and subsequent treatments, is characterized by the fact that it comprises the following steps:

a) introduction of at least one flavouring into the polymer during a stage prior to extrusion, b) passage of the molten mass into a spinning head fitted with a die, c) cooling the monofilaments in water to a temperature between 20° and 35° C., d) partial drawing in water at a temperature of between 85° and 95° C., e) supplementary drawing in one or two stages at a temperature of between 170° and 200° C., f) heat treatment at a temperature greater than 170° C., g) oiling, and h) taking up the monofilaments on known supports, in particular on the bobbins in a bobbin frame.

The cooling, step c), and the partial drawing, step d), preferably take place by passage through tanks containing water at the desired temperature.

The supplementary hot drawing and the subsequent heat treatment preferably take place in hot circulating air ovens. These treatments are preferably carried out on a sheet of monofilaments arranged side by side.

The introduction of the flavouring into the polymer mass during a stage located upstream of the extrusion can be carried out by any known means for introducing adjuvants into the mass of a polymer, which may or may not be molten. Preferably, the flavouring is introduced before melting of the polymer, for example by dry coating of the polymer granules.

Carrying out the above process leads to the monofilaments according to the general definition. For the monofilaments intended for fishing, the drawing rates and temperatures and the subsequent heat treatment temperatures are chosen so as to obtain a shrinkage in boiling water greater than or equal to 8%, the shrinkage being measured after treatment of the filament with boiling water for thirty minutes without tension.

Likewise, as already indicated, a copolyamide 66/6 in the weight proportions 75 to 90% of polyamide 66 and 25 to 10% of polyamide 6, and preferably in the proportions 75/25, will be used. In this way highly porous filaments having a high capacity for absorbing and eliminating water are obtained. This is particularly advantageous because the flavourings and aromas introduced into the mass are able to migrate progressively from the interior towards the exterior when the monofilaments are in water; on the other hand, the said monofilaments conserve their flavourings and aromas well when they are not in water.

The penetration of water into the interior of the porous filament causes the latter to become pliable. Thus, the measurement of the rigidity of the monofilament out of water and in water enables estimation of its porosity and thus its capacity for absorbing and eliminating water and for diffusing the flavourings and aromas introduced into the mass. In the present application, the rigidity is expressed by the sonic modulus, the measurement of which is carried out under the following conditions.

Measurement of the Rigidity Expressed by the Sonic Modulus for Fishing Lines:

The measurements are carried out using the equipment marketed in the USA by the MORGAN company under the name "Dynamic Modulus Test PPM-R R", which enables a standard determination (ASTM F 89-68) of the sonic modulus of a flexible material.

The textile filament is subjected at one of its ends to a mechanical pulse at sound frequency (=5000 hertz) by means of a piezoelectric ceramic excited by an electrical pulse. The wave propagates in the medium and is detected at the other end of the filament by a ceramic. The time T taken by the sound wave to travel, within the interior of the material, the distance L separating the transmitter from the receiver is noted. One of the ceramics remains fixed, while the other can be moved along the sample, which enables the straight line L=f(T) to be plotted, the slope of which gives the speed of the sound in the material $$V = \frac{\Delta L}{\Delta T}$$

The operating conditions are as follows:
tests between 3 and 20 cm, continuous, on a filament stretched under 200 cN (2 series of measurements per filament)
tests carried out dry (20° C. and 65% relative humidity) and wet (after soaking the monofilaments in water)

This simple technique has several advantages:
non-destructive test permitting the development of a sample as a function of an external parameter (temperature, relative humidity . . . ) to be followed
speed of the sound, as a first approximation, independent of the shape and of the cross-section of the material, which offers a great advantage for the study of textile filaments.

The results are expressed in megapascals.
E=$\rho V2$ in megapascals
E=sonic modulus
$\rho$=linear mass (g/cm$^3$)
V=speed of the sound (km/s)

The higher the value of the sonic modulus, the greater the rigidity of the monofilament.

The monofilament according to the present application can be coloured or colourless; if a coloured monofilament is desired, it will be posssible to effect the colouring:
by incorporation of soluble pigments and/or dyes in the polymer granules before extrusion or
by surface colouring of the non-drawn monofilament. In this case, before drawing in hot water, the monofilament passes through an aqueous bath containing the dyes and adjuvants intended to promote colouring: wetting agents and swelling agents promoting the swelling of the non-stretched pores of the filament.

However, the present invention will be better understood with the aid of the examples and of the figure given below, which are given by way of illustration and are non-limiting.

The figure shows schematically the production line used for carrying out the process. For greater clarity of the figure, the production line is shown in two sections on two levels; however, in fact it is one and the same continuous line extending without break on the same horizontal level. The monofilaments 2 issuing from the extruder 1 and arranged generally as a sheet pass through a tank 3 for cooling with water 4, then over a bench 5 fitted with seven rollers 24 and enter a tank 6 containing water at the desired temperature.

A first drawing is effected in the tank 6 between the drawing bench 5 and the drawing bench 7. After this first drawing, a second and a third drawing respectively are carried out between the benches 7 and 8 and between the bench 8 and the bench 9, each of the benches containing seven rollers. Since the treatments are carried out on a sheet of monofilaments arranged side by side, the purpose of the rollers of the benches is to keep the filaments side by side with constant tension of each monofilament, without overlapping. The two subsequent drawings are carried out with the filaments passing through ovens 10 and 11 fed with hot air to promote drawing. Finally, the monofilaments 2 at the exit from the bench 9 pass through a heat treatment oven 12 and over the rollers of the bench 13, the speed of which is less than that of the rollers of the bench 9. At the exit from this bench 13, the monofilaments are sized by means of an oiling roller 14 and then wound up by a known means, such as a bobbin frame 15, in the form of bobbins 16.

The following examples illustrate the application of the present application to line fishing, without limiting it. In these examples the following are produced on the one hand colourless, flavoured monofilaments according to the present application (monofilaments A) and on the other hand colourless, non-flavoured monofilaments of the same composition and obtained under the same conditions except for the introduction of flavouring into the mass (monofilaments B); finally, various commercial monofilaments (monofilaments C) are also used.

Two types of tests are carried out.

According to the first test, the sonic modulus of a monofilament B is measured under different conditions (dry, wet). In certain cases it is compared with the sonic modulus of commercial monofilaments C under the same conditions. As already indicated, these measurements enable an estimate to be made of the porosity of the monofilaments and thus of their capacity for absorbing and eliminating water and for diffusing flavourings and aromas introduced into the mass in accordance with the present application.

According to the second test, a flavoured monofilament according to the invention is tested by olfactory and taste evaluation and this monofilament is then compared with ordinary commercial monofilaments in use during fishing.

EXAMPLE 1: OBTAINING MONOFILAMENTS B (non-flavoured)

They are obtained by a process in accordance with the process according to the application with the exception of step a): introduction of a flavouring into the polymer.

A copolyamide 66/6 in the proportions of 75/25 by weight, with a melting point of 200° C. and a viscosity index (IV) of 170 in accordance with the International Standard ISO-307-1977 is extruded under the following operating conditions:

| | |
|---|---|
| Die | 26-hole |
| Diameter of the capillaries | 0.9 mm |
| Total output | 18.1 kg/h |
| Extrusion and spinning temperature | 270° C. |

After extrusion, the monofilaments B are subjected to various treatments and pass through various installations such as in FIG. No. 1, under the following conditions.

| Temperature of the water in cooling tank No. 3 | 35° C. |
|---|---|
| 1st drawing: | |
| Speed of bench 5: | 32.6 m/min |
| Speed of bench 7: | 117.4 m/min |
| Degree of 1st drawing: | 3.60 |
| Temperature of the water in tank 6: | 95° C. |
| 2nd drawing: | |
| Speed of bench 7: | 117.4 m/min |
| Speed of bench 8: | 146.7 m/min |
| Total degree after 2nd drawing: | 4.5 |
| Temperature of the air in oven 10: | 180° C. |
| 3rd drawing: | |
| Speed of bench 8: | 146.7 m/min |
| Speed of bench 9: | 195.7 m/min |
| Total degree of drawing: | 6.0 |
| Temperature of the air in oven 11: | 190° C. |
| Relaxation and fixing: | |
| Speed of bench 9: | 195.7 m/min |
| Speed of bench 13: | 180 m/min |
| Degree of relaxation: | 8% |
| Temperature of the air in oven 12: | 180° C. |
| Spooling: | |
| Speed of spooling on the bobbin frame 15: | 180 m/min |
| Weight of the bobbins 16: | 2 kg |

The monofilaments obtained have the following characteristics:

| titer | 644.5 dtex |
|---|---|
| mean diameter | 0.268 mm |
| mean linear breaking strength according to the Standard NF 36150 | 4.70 daN |
| mean elongation at break | 22% |
| mean shrinkage in boiling water | 28% |
| mean tensile strength | 80 kg/mm$^2$ |

These monofilaments B differ from the monofilaments A according to the application only in the fact that no flavouring is introduced into the mass.

Their dynamometric characteristics are in accordance with those claimed for the monofilaments according to the application.

Using the same copolyamide and the same process and adjusting the parameters, in particular the output, it is possible to obtain monofilaments B of various diameters, for example 10/100 mm or 20/100 mm, this being carried out in order to be able to compare these filaments with commercial monofilaments of the same diameter. Obviously, these monofilaments B also correspond to the dynamometric characteristics of the monofilaments according to the application.

The first type of tests is carried out on these monofilaments B.

1 Comparison of three 10/100 mm diameter fishing lines

The three lines considered are:

a line of type B of the Applicant obtained by the process according to the present application except for step a), the introduction of a flavouring into the mass, based on copolyamide 66/6 in proportions of 75/25 a line having the commercial name "CORTEST SUPER MATCH" from the company CORMORAN, based on copolyamide 6/66 in proportions of 85/15 according to the analyses carried out by the Applicant: line C 1.

a line having the commercial name "SIGLON" from the company SUNLINE, stated to be coated with a water-repellent resin intended to slow down the penetration of water into the interior of the line, based on copolyamide 6/66 in proportions of 85/15 according to the analyses carried out by the Applicant: line C 2.

The sonic modulus of the filaments soaked in water is measured.

The rigidities expressed by the sonic modulus were measured:
dry
after soaking for 10 min in water
after soaking for 30 min in water
after soaking for 24 h in water
The results are given in Table 1 below:

TABLE 1

| | SONIC MODULUS IN MPa | | | |
|---|---|---|---|---|
| | | SOAKING IN WATER FOR | | |
| TYPE | DRY | 10 min | 30 min | 24 h |
| B | 3900 | 1900 | 1200 | 1200 |
| C 1 | 5000 | 3300 | 2900 | 1500 |
| C 2 | 5600 | 3900 | 3000 | 2500 |

As the table shows, the line B is more supple when dry and, above all, it becomes pliable very rapidly and to a much greater extent than the two lines C 1 and C specially line C 2 stated to be water-repellent.

Measurement of the sonic modulus on line wetted and then dried

The study was carried out using line B of the Applicant, having a diameter of 20/100 mm and obtained by the process according to the present application except for step a), the introduction of a flavouring into the mass.

1st step: dry line
2nd step: line wetted in water (10 min-30 min-2 h-24 h)
3rd step: line dried after wetting for 24 h (drying 10 min-30 min-24 h)

The rigidities expressed by the sonic modulus are indicated in Table 2 below.

TABLE 2

| | 1st STEP | 2nd STEP WETTING Wetting time | | | | 3rd STEP DRYING a line wetted for 24 h Drying time | | |
|---|---|---|---|---|---|---|---|---|
| | DRY LINE | 10 min | 30 min | 2 h | 24 h | 10 min | 30 min | 24 h |
| Sonic modulus MPa | 4200 | 3600 | 3000 | 1700 | 1400 | 1700 | 2000 | 3400. |

It is noted that the line wetted in the course of 24 h soaking becomes progressively more pliable. The line wetted (for 24 h) and then placed in the ambient air progressively eliminates its water until it recovers virtually its entire initial rigidity in the course of 24 h.

This line exhibits a very significant water absorption and elimination phenomenon.

These two series of measurements enable an estimate to be made of the advantage of the monofilament based on copolyamide 66/6 in the proportions 75/25 obtained by a process according to the application, except for the introduction of flavourings into the mass. These measurements show the excellent porosity of this monofilament and thus its capacity for absorbing and eliminating water and consequently of diffusing flavourings and aromas, introduced into the mass, when the process according to the present application has been carried out.

EXAMPLE 2: OBTAINING FLAVOURED MONOFILAMENTS ACCORDING TO THE INVENTION

Various flavourings and flavours provided by the companies RHONE POULENC and PCAS (Produits Chimiques Auxiliaries de Synthese) are introduced by dry coating into the copolyamide granules according to Example 1. The monofilaments are extruded, drawn and treated under the same conditions as above (Example 1).

Each flavour or flavouring has been introduced in a proportion of 0.05% by weight, separately, so as to be able to check that the characteristics of the filament obtained are maintained and the capability of each product for developing its flavouring and its aroma when dry and, especially, in water.

1ST EXAMPLE

"Poulet rôti" ("roast chicken") flavour from PCAS, in a proportion of 0.05% in the granules.

2ND EXAMPLE

"Cochon rôti" ("roast pork") flavour from PCAS in a proportion of 0.05%

3RD EXAMPLE

"Champignon" ("mushroom") flavour from PCAS in a proportion of 0.05%

4TH EXAMPLE

"Pêche" ("peach") flavour based on C 14 aldehyde (=gamma-undecalactone) from PCAS in a proportion of 0.05%

5TH EXAMPLE

"Noix de Coco" ("coconut") flavour based on C 18 aldehyde (=gamma-nonalactone) from PCAS in a proportion of 0.05%

6TH EXAMPLE

"Chocolat" ("chocolate") flavour from PCAS in a proportion of 0.05%

7TH EXAMPLE

"Bois" ("wood") flavour based on a mixture of isomeric trimethylnorbornylcyclohexanols from RHONE POULENC in a proportion of 0.05%

8TH EXAMPLE

"Foin coupé" ("new-mown hay") flavour based on 1,2-benzopyrone (=coumarin) from RHONE POULENC in a proportion of 0.05%

9TH EXAMPLE

"Vanille" ("vanilla") flavour based on 3-ethoxy-4-hydroxy-benzaldehyde (=ethylvanilline) from RHONE POULENC in a proportion of 0.05%

10TH EXAMPLE

"Vanille" ("vanilla") flavour based on 3-methoxy-4-hydroxy-benzaldehyde (=vanilline) from RHONE POULENC in a proportion of 0.05%

The dynamometric characteristics of these monofilaments, including the sonic modulus measured under the same conditions, are identical to those of the non-flavoured monofilaments according to Example 1.

The value of these filaments into which it is possible to introduce at will one or more flavours or flavourings capable of migrating into water will be understood when the very great ability of fish to recognize the flavours and the flavourings in water is known.

Some products such as ethylvanilline develop a flavouring and an aroma so powerful that people who do not have exceptional sensory faculties are able to smell the odour of vanilla very well on the dry filament and on the water in which the filament has been soaked for several hours. The same people are also able to detect the taste of vanilla when bringing the filament to the lips (as fishermen do just before making a knot with the fishing line) or on tasting water in which the filament bulk-loaded with vanilla has been soaked.

The other flavourings and aromas, and in particular "mushroom", "chocolate", "coconut" and "new-mown hay", in the judgment of people having an excellent sense of taste and smell, have been able to confirm not only that the filaments released flavourings and flavours dry but that the same flavourings and flavours continued to develop after several cycles of soaking in water and drying in air (2 to 4 hours in water followed by 24 hours drying).

Moreover, as was foreseeable, in many cases the filaments appear to be more highly flavoured after an initial soaking in water. The progressive migration of the flavourings incorporated in the mass of the monofilaments will thus enable lines to be used on several different fishing trips.

Moreover, the incorporation of flavouring in the monofilament also makes it possible to mask human odours as well as the odour and taste of tobacco, which almost always permeate the fingers of the smoker and are then transmitted to the monofilaments in contact with the fingers, constituting a repellent for the fish.

In order to provide a good demonstration of the value of these flavoured fishing lines, two excellent fishermen (former champions of France in groundbait fishing and reel fishing) were asked to test these lines for several weeks, fishing for carp in ponds and rivers As the two fishermen reported, the carp were preferentially attracted by the hooks carrying flavoured lines.

IN PONDS

In thirty fishing expeditions with four rods, two were fitted with a casting line (cast) made of polyester and two had a cast of vanilla-flavoured monofilament according to the invention. Provided with the same bait, the lines were arranged alternately and the number of bites by carp was found to be three to one in favour of the flavoured line.

IN RIVERS

Still with thirty fishing expeditions with four rods, but arranged differently: the two downstream lines (better positioned) fitted on polyester or on ordinary nylon and the two upstream lines with a cast of flavoured monofilament according to the invention.

In a first period, there were as many bites upstream as downstream but at the end of three or four days the suspicious carp fed without hesitation only at the lines with flavoured cast, while they tugged only briefly at the other lines without further result.

Examples 1 and 2 clearly show the advantages and the value of the flavoured monofilaments according to the present application.

Obviously, the invention is not restricted to the examples described but incorporates all variants falling within the scope of the general definition.

In particular, the list of flavours and flavourings given by way of example is not limiting. It is also possible to introduce fish or crustacean oils into the mass of the monofilament. It is also possible to introduce bactericides and fungicides with a view to preventing the formation of moulds, fungi and algae Moreover, although the monofilaments according to the application are particularly advantageous for their use as fishing lines, they can find other applications. Thus, by adapting the dynamometric properties and in particular the shrinkage, it is possible to use them for applications such as weaving, knitting, trimmings, production of nets, etc. . . .

I claim:

1. A synthetic flavored monofilament useful as a fishing line comprising a homopolyamide or copolyamide and 0.05% by weight of at least one flavoring agent evenly dispersed throughout the mass of said homo- or co-polyamide and having a linear breaking strength of at least 50 kg/mm$^2$ for diameters greater than 70/100 mm and less than or equal to 200/100 mm and of at least 20 kg/mm$^2$ for diameters greater than 200/100 mm and less than or equal to 300/100 mm and having a shrinkage in boiling water of at least 8%.

2. A synthetic monofilament useful as fishing line comprised of a copolyamide 66/6 in the proportions of 75 to 90% of polyamide 66 and 25 to 10% of polyamide 6 and at least one flavoring agent evenly distributed throughout the mass thereof and having a linear breaking strength of at least 50 kg/mm$^2$ for diameters less than or equal to 70/100 mm, of at least 30 kg/mm$^2$ for diameters greater than 70/100 mm and less than or equal to 200/100 mm and of at least 20 kg/mm$^2$ for diameters greater than 200/100 mm and less than or equal to 300/100 mm and a shrinkage in boiling water of at least 1%.

3. A monofilament according to claim 2, wherein the proportion by weight of polyamide 66 units to polyamide 6 units is 75 to 25.

4. The synthetic monofilament of claim 2 having a shrinkage in boiling water of at least 8%.

5. The synthetic monofilament of claim 4 wherein the amount of the at least one flavoring agent is 0.5% by weight.

* * * * *